(12) United States Patent
Uchiyama et al.

(10) Patent No.: US 7,556,753 B2
(45) Date of Patent: Jul. 7, 2009

(54) METHOD OF INDICATING AN OPEN/CLOSE STATE OF A CHECK VALVE OF AN INJECTION MOLDING MACHINE

(75) Inventors: Tatsuhiro Uchiyama, Minamitsuru-gun, Yamanashi (JP); Satoshi Takatsugi, Minamitsuru-gun, Yamanashi (JP); Osamu Saito, Minamitsuru-gun, Yamanashi (JP); Junpei Maruyama, Minamitsuru-gun, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 67 days.

(21) Appl. No.: 11/923,459

(22) Filed: Oct. 24, 2007

(65) Prior Publication Data

US 2008/0197521 A1 Aug. 21, 2008

(30) Foreign Application Priority Data

Feb. 15, 2007 (JP) ............................. 2007-034886

(51) Int. Cl.
*B29C 45/80* (2006.01)
*B29C 45/76* (2006.01)

(52) U.S. Cl. ..................................... 264/40.1; 425/125
(58) Field of Classification Search .............. 137/87.02, 137/554; 73/862.381; 264/40.1, 40.5; 425/125
See application file for complete search history.

(56) References Cited

U.S. PATENT DOCUMENTS 5,153,149 A 10/1992 Naito et al.
5,792,395 A * 8/1998 Ito et al. ..................... 264/40.1
7,074,028 B2 7/2006 Watanabe et al.
2004/0139810 A1 7/2004 Saito et al.
2006/0278014 A1 12/2006 Okada et al.
2008/0150181 A1* 6/2008 Maruyama et al. .......... 264/40.7
2008/0199551 A1* 8/2008 Maruyama et al. .......... 425/145
2008/0305202 A1* 12/2008 Oomori et al. .............. 425/171

FOREIGN PATENT DOCUMENTS

| JP | 1-168421 A | 7/1989 |
|---|---|---|
| JP | 03-092321 A | 4/1991 |
| JP | 04-053720 A | 2/1992 |
| JP | 04-201225 A | 7/1992 |
| JP | 2004-216808 A | 8/2004 |
| JP | 2006247874 | 9/2006 |

OTHER PUBLICATIONS

Extended EP Search Report for EP07119509.3 dated May 20, 2008.

* cited by examiner

*Primary Examiner*—John Rivell
(74) *Attorney, Agent, or Firm*—Lowe Hauptman Ham & Berner LLP

(57) ABSTRACT

A method of indicating an open/close state of a check valve of an injection molding machine simply and more accurately. The method detects screw rotational force during injection and displays in wave form on the screen of a display device changes in detected rotational force. An open/close state of the check valve can be indicated based on the waveform pattern displayed on the display screen because the screw rotational force waveform pattern changes when the check valve closes. From the fact that the screw rotational force waveform pattern changes when the check valve closes, the open/close state of the check valve can be indicated from the displayed waveform.

10 Claims, 5 Drawing Sheets

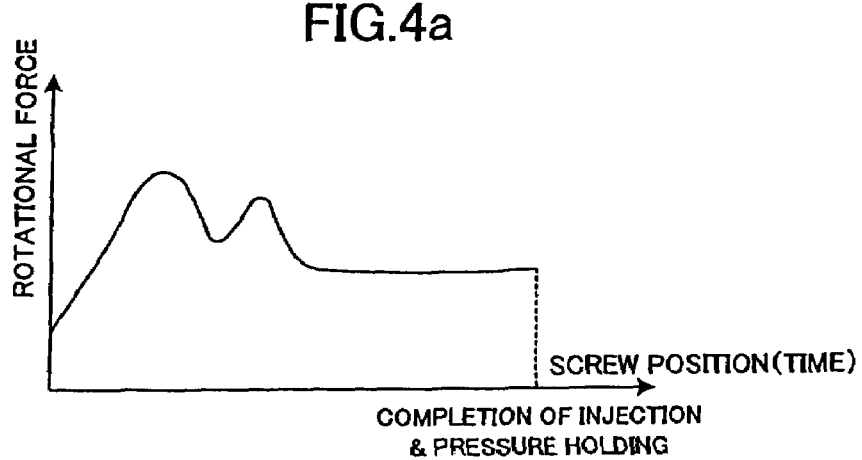
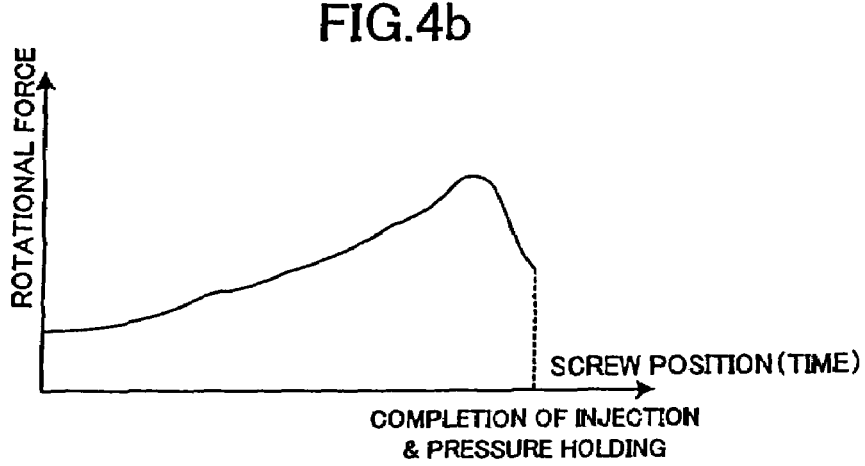
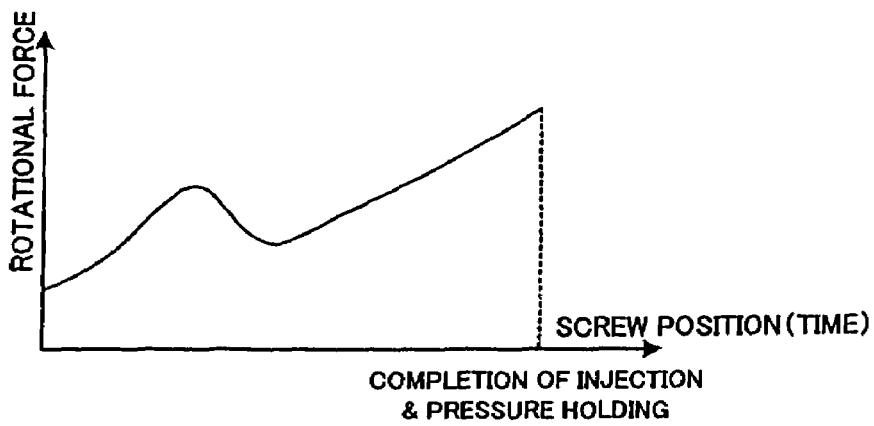

METHOD OF INDICATING AN OPEN/CLOSE STATE OF A CHECK VALVE OF AN INJECTION MOLDING MACHINE

BACKGROUND OF THE INVENTION

1. Field of the Invention

The present invention relates to method of indicating an open/close state of a check valve when driving a screw in a direction of injection in an injection molding machine having a check valve on the screw.

2. Description of the Related Art

Injection molding machines having an injection unit provided with a check valve at a tip of a screw to prevent backflow of resin during injection, such as an in-line screw type injection molding machine, have conventionally been used.

FIG. 1 shows one example of such a check valve. A check ring 3 that is capable of moving in the axial direction of the screw is disposed at a portion of reduced diameter between the screw head 2 mounted on the tip of the screw 1 and the body of the screw 1, and a check seat 4 that contacts and closely adheres to the check ring 3 to close a resin flow channel is provided on a screw 1 body side of the portion of reduced diameter. Resin pellets supplied to the interior of a cylinder 7 from the rear of the screw 1 are melted by shear heat generated by rotation of the screw 1 during metering and by heat from a heater provided on the outside of the cylinder 7 into which the screw 1 is inserted. The melted resin causes the resin pressure behind the check ring 3 to increase, generating a force that pushes the check ring 3 forward. As the check ring 3 is pushed forward, the rearward resin passes through a gap between the check ring 3 and the portion of reduced diameter and flows in front of the check ring 3, increasing the pressure inside the cylinder 7 in front of the screw head 2.

When the pressure in front of the check ring 3 exceeds a predetermined pressure (back pressure), the screw 1 is pushed back and the pressure in front of the check ring 3 is reduced. As the screw 1 rotates further, the pressure behind the check ring 3 becomes higher than the pressure in front of the check ring 3, and the melted resin continues to flow to the front of the check ring 3. When the screw 1 retreats a predetermined amount, screw rotation is stopped to terminate the metering process.

Next is the injection process, in which, as the screw 1 advances to fill a mold with the resin, the resin pressure building ahead of the screw head 2 increases, causing the check ring 3 to retreat and adhere closely to the check seat 4, closing the resin flow channel and preventing the melted resin from flowing backward (back-flowing) in the direction of retreat of the screw 1 due to fill pressure.

During injection the check valve is closed because the pressure in front of the check ring 3 becomes greater than the pressure behind the check ring 3 due to the advance of the screw 1. However, immediately prior to injection, the rear of the check ring 3 is subjected to pressure from resin in a compressed state accumulated in grooves 6 between flights 5, and under the influence of this pressure the timing with which the check valve closes fluctuates, which is a problem. During the time period from the start of injection to the closing of the check valve there occurs a backflow of resin from the front of the check valve toward the rear, and therefore fluctuation in the timing of the closing of the check valve produces fluctuation in injection volume at each cycle, which affects the quality of the molded article.

Consequently, means to enable the check valve to close consistently at the same time in every cycle have been considered, and at the same time methods of monitoring the actual timing with which the check valve closes have been proposed. Moreover, detecting the position of the screw when the check valve closes and measuring the time from the start of injection have been used to set molding conditions, such as the position at which to switch from injection velocity control to pressure holding control and the velocity switchover position, as well as to provide a basis on which to judge the quality of the molded article.

For example, inventions are known that provide a pressure sensor that detects the resin pressure inside the cylinder at a position behind the check valve, detects the closing of the check valve based on a change in pressure detected by such pressure sensor as the screw advances, judge the quality of the articles and adjust the molding conditions based on the position at which the closing of the check valve is detected (see, for example, JP04-53720A and JP04-201225A).

In addition, an arrangement is known that disposes an electrically conductive member behind and opposite a ring valve of a check valve and detects the position of the ring valve, which is to say the time at which the resin flow channel is closed by the ring valve, by measuring the amount of static electricity between the ring valve and the conductive member (see JP03-92321A).

Moreover, in JP01-168421A, an arrangement is described that has nothing that detects the timing of the closing of the check valve during injection but which detects torque exerted on the screw during injection and detects a malfunction of the check valve such as damage or the like by the torque so detected.

Further, an invention is also known that makes use of the fact that, although as the screw is rotated freely and injection starts the resin flows and causes the screw to rotate, once the check valve closes and the backflow of resin stops the rotation of the screw also stops. The invention detects this halting of the rotation of the screw as the time at which the check valve closes, and further, corrects the injection velocity switching position and the position at which the switch is made to pressure holding based on the position at which the closing of the check valve is detected (JP2004-216808A).

However, the inventions described in JP04-53720A and JP04-201225A detect the closing of the check valve by detecting a change in pressure inside the cylinder, and this method requires the addition of a pressure sensor behind the check valve. The pressure sensor must be separated from the front end of the cylinder by at least a distance greater than the maximum injection stroke, and as a result the distance between the check valve and the pressure sensor varies as the injection stroke is larger or smaller, which in turn creates variation in detection accuracy. In addition, although it is preferable that the inner wall surface of the cylinder be without gradations and form a smooth flow channel so that carbide due to resin accumulation does not form, once a pressure sensor that directly contacts the resin is installed the occurrence of tiny gradations in the inner wall surface of the cylinder is unavoidable, with deleterious effects such as carbide due to resin accumulation getting mixed into the molded article. Moreover, with a pressure sensor of a type that indirectly detects the pressure of the resin by detecting deformation of the cylinder indirectly without directly contacting the resin, detection accuracy is sacrificed. Further, pressure sensors of all types are expensive and difficult to handle, and many require periodic maintenance and correction as well.

In addition, detection systems that detect the closing of the ring valve by measuring the amount of static electricity like the invention described in JP03-92321A must add means for measuring the amount of static electricity, such as providing a conductive member for measuring the amount of static electricity on the screw, punching a hole for passing wiring in the center of the screw, and further, providing a slip ring for outputting measurement signals on the screw, which complicates the configuration.

The invention described in JP2004-216808A focuses on a component force Fθ in a direction of rotation of the screw of a force exerted on the flights by backflow resin, and as noted above detects the closing of the check valve by detecting a halt in the rotation of the screw, which rotates freely during injection.

However, when the rotary screw is rotated by the backflow resin, as long as the backflow amount is small, the force exerted by the backflow resin on the screw to make the screw rotate is within a maximum static frictional force range of the screw against the cylinder, and therefore the screw does not rotate. Then, as the backflow amount increases and the force exerted on the screw causing the screw to rotate exceeds the maximum static frictional force, the screw begins to rotate. Once the screw begins to rotate there is a shift to a dynamic friction range, and therefore even when the force exerted by the backflow resin on the screw causing the screw to rotate falls below the maximum static frictional force the screw nevertheless continues to rotate if the force exerted on the screw causing the screw to rotate by the backflow resin is equal to or greater than the dynamic frictional force. As a result, when the force exerted on the screw by the backflow resin causing the screw to rotate is equal to or greater than the dynamic frictional force but equal to or less than the maximum static frictional force, if the rotation of the screw has already halted then that stopped state continues; if the screw has already been rotating, then that state of rotation continues. Thus, it cannot be said that there is always a linear relation between the size of the backflow amount and the screw rotation amount, and as a result, in a method of detecting the closing of the check valve from the screw rotation amount as in the invention described in JP2004-216808A, there is the possibility of including error in the detection of the valve closing timing.

Moreover, with the invention described in JP2004-216808A, although it detects the halting of the rotation of the screw, in order to detect that halt in rotation it is necessary to set some sort of threshold value. Sometimes the screw stops rotating slowly and sometimes quickly, and therefore, in order to detect accurately a halt in rotation under such varying conditions, it is necessary to set the threshold value appropriately. However, obtaining the appropriate threshold value requires time and effort, and moreover, the threshold value must be readjusted every time there is a change in the conditions of molding.

SUMMARY OF THE INVENTION

The present invention provides a method of indicating an open/close state of a check valve simply and more accurately.

A method of the present invention indicates an open/close state of a check valve provided on a screw of an injection molding machine in which the screw is arranged rotatable for metering of resin and axially movable for injection of resin in a cylinder. The method comprises the steps of: detecting a rotational force exerted on the screw during being driven for the injection; and displaying variation of the detected rotational force as a waveform on a display device to indicate the open/close state of the check valve based on the displayed waveform.

The detecting step may comprise detecting the rotational force exerted on the screw and an axial position of the screw to be associated with the rotational force at every predetermined sampling period, and the displaying step comprises displaying the waveform of the detected rotational force with respect to the axial position of the screw.

The detecting step may comprise detecting the rotational force exerted on the screw at every predetermined sampling period, and the displaying step may comprises displaying the waveform of the detected rotational force with respect to time.

The present invention utilizes the fact that the waveform of the rotational force exerted on the screw as the screw advances changes the check valve closes, and displays on the screen of the display device that waveform, thus enabling the open/close state of the check valve to be grasped easily from the displayed waveform pattern.

BRIEF DESCRIPTION OF THE DRAWINGS

FIGS. 4a-4c are diagrams showing typical examples of waveform patterns of rotational force exerted on the screw during injection and pressure holding;

DETAILED DESCRIPTION

A detailed description will now be given of illustrative embodiments of the present invention, with reference to the accompanying drawings.

First, a description is given of the principle behind a method of indicating an open/close state of a check valve according to the present invention.

The present invention identifies an open/close state of a check valve using a waveform pattern of rotational force exerted on a screw during injection.

Figure 2:
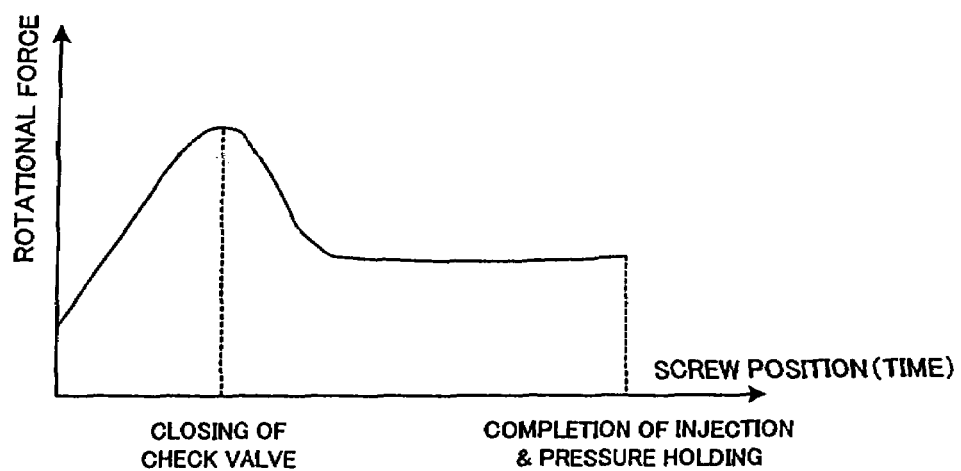
FIG. 2 is a graph illustrating a waveform pattern of rotational force exerted on the screw in an injection and pressure holding stage.

FIG. 2 is a graph illustrating the waveform pattern of the rotational force exerted on the screw in an injection and pressure holding process. The horizontal axis represents a position of the screw in a direction of injection (screw axial direction position) or time, and the vertical axis represents the rotational force exerted on the screw.

Figure 1:
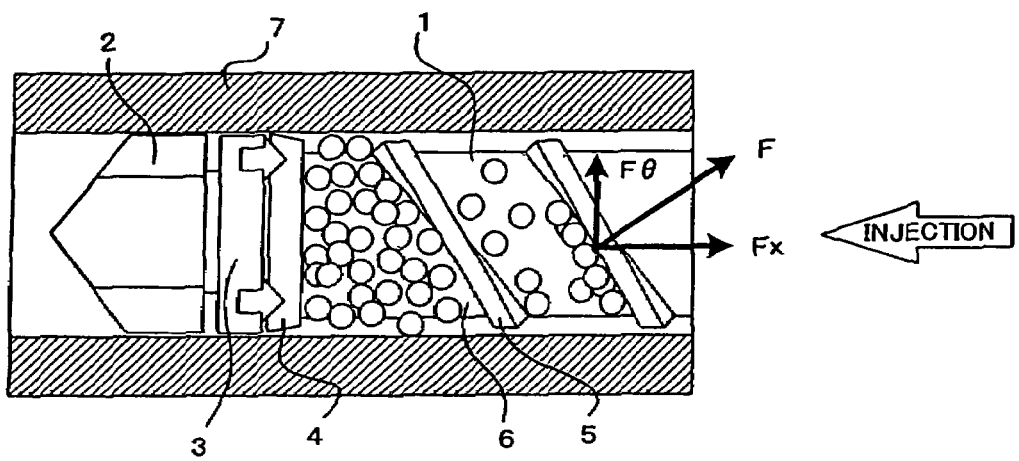
FIG. 1 is a schematic diagram illustrating a check valve provided on a tip of a screw and backflow of resin occurring during injection.

After metering is completed but before injection begins, movement of the screw 1 in the axial direction as well as rotation of the screw are in a stopped state, with the screw angle of rotation maintained. At this time, unmelted and/or partially melted resin in a compressed state is on flights 5, which form the plasticization portion of the screw. From the compressed resin in grooves 6 between the flights 5 the screw 1 receives a rotational force Fθ in a direction of rotation of the screw 1 as shown in FIG. 1. Then, once injection starts and the screw 1 begins to advance, with the start of the advance of the screw 1 resin starts to flow backward (backflow) through a gap between a check ring 3 and a check seat 4. The pressure of this backflow resin acts on the flights 5 of the screw 1, imparting rotational force that rotates the screw 1 and increasing the rotational force Fθ.

Eventually, the check ring 3 moves and adheres closely to the check seat 4, thus closing a check valve. With the closing of the check valve the resin backflow disappears, and the rotational force starts to decrease. As a result, at the moment the check valve closes the rotational force reaches its peak value, and thereafter consists only of the rotational force from the compressed resin accumulated in the grooves 6 between the flights 5.

Thus, as described above, during injection and pressure holding, the rotational force that acts on the screw 1 after the start of injection forms a pattern like that shown in FIG. 2, in which the rotational force reaches its peak at the moment the check valve closes.

As shown in this pattern, a distance through which the screw moves up to a time when the rotational force peak value is detected is an interval in which resin backflow occurs, and the position of the screw or the time when this peak appears indicates the amount of resin backflow. Accordingly, from the peak time (the point in time at which the check valve closes), the open/close state of the check valve can be indicated and the quality of the molded article can be judged. In addition, based on the peak time, molding conditions such as a position at which to switch injection velocity, the position at which to switch from injection to pressure holding, and the like can be adjusted as well.

By contrast, due to a malfunction of the check valve, a problem with the molding conditions or the like, patterns other than the commonly occurring waveform pattern shown in FIG. 2 also occur. FIGS. 3a-3c and FIGS. 4a-4c show typical examples of waveform patterns of rotational force acting on the screw 1 during injection and pressure holding. In FIGS. 3a-3c and FIGS. 4a-4c, the horizontal axis represents the screw position (screw axial direction position) or time, and the vertical axis represents the rotational force exerted on the screw 1.

Figure 3A:
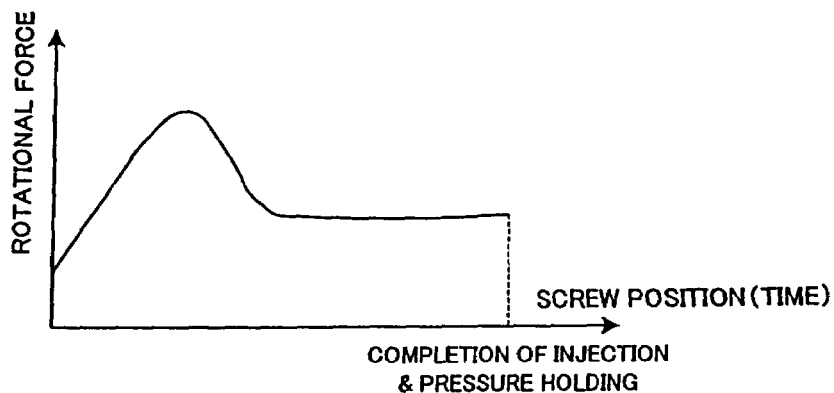
FIGS. 3a-3c are diagrams showing typical examples of waveform patterns of rotational force exerted on the screw during injection and pressure holding.

FIG. 3a shows the usual, commonly occurring waveform pattern like that shown in FIG. 2.

Figure 3B:
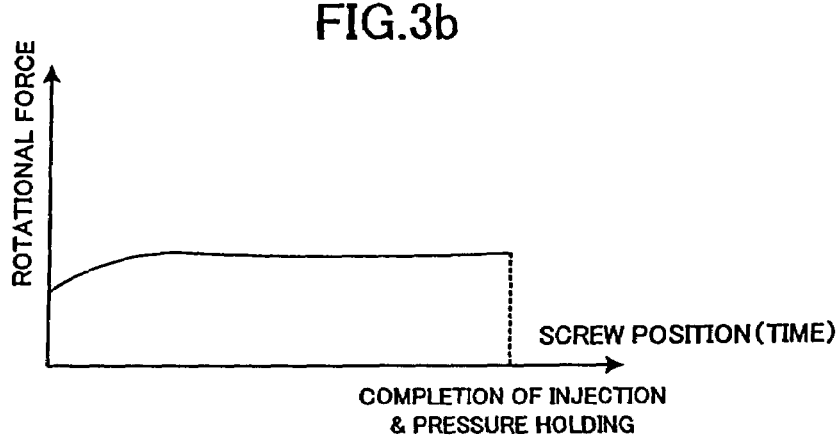

The waveform pattern shown in FIG. 3b indicates a state in which the check valve is already closed at the start of injection, such that, once injection starts, a force exerted on the screw 1 causing the screw 1 to rotate only increases due to small amounts of resin leaking and back-flowing from the vicinity of the check ring 3 (that is, the gap between the check ring 3 and a cylinder 7), in a state in which the rotational force does not peak.

Figure 3C:
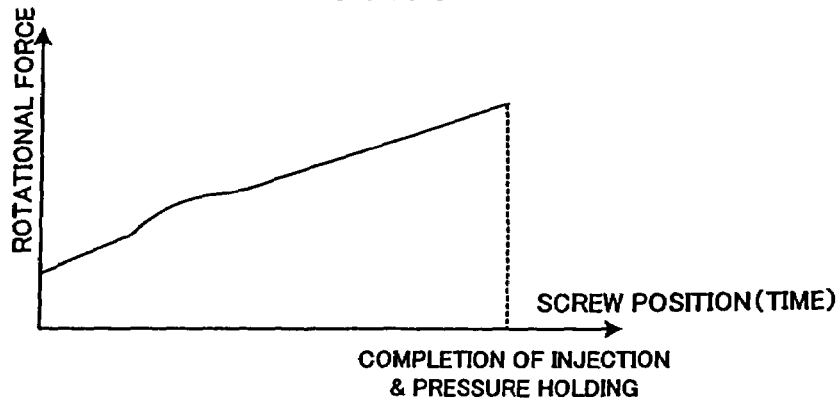

The waveform pattern shown in FIG. 3c indicates a state in which the check valve does not close, and the rotational force exerted on the screw increases without peaking.

The waveform pattern shown in FIG. 4a indicates a state in which the rotational force peaks multiple times, in which a first closing of the check valve is incomplete and the check valve closes on a second closing.

The waveform pattern shown in FIG. 4b indicates a state in which the closing of the check valve occurs just prior to the end of injection.

The waveform pattern shown in FIG. 4c indicates a state in which the closing of the check valve is incomplete and the check valve is in an incompletely closed state, in which the resin backflow continues.

As shown in FIGS. 3a-3c and FIGS. 4a-4c, the closing of the check valve can be indicated from the rotational force pattern exerted on the screw 1 during injection and pressure holding. The present invention measures the rotational force exerted on the screw during injection and pressure holding and displays that rotational force as a waveform pattern, thereby enabling the closing of the check valve to be indicated. This indication is helpful in providing a basis for judging the quality of the molded article, adjusting the molding conditions, and so forth.

Figure 5:
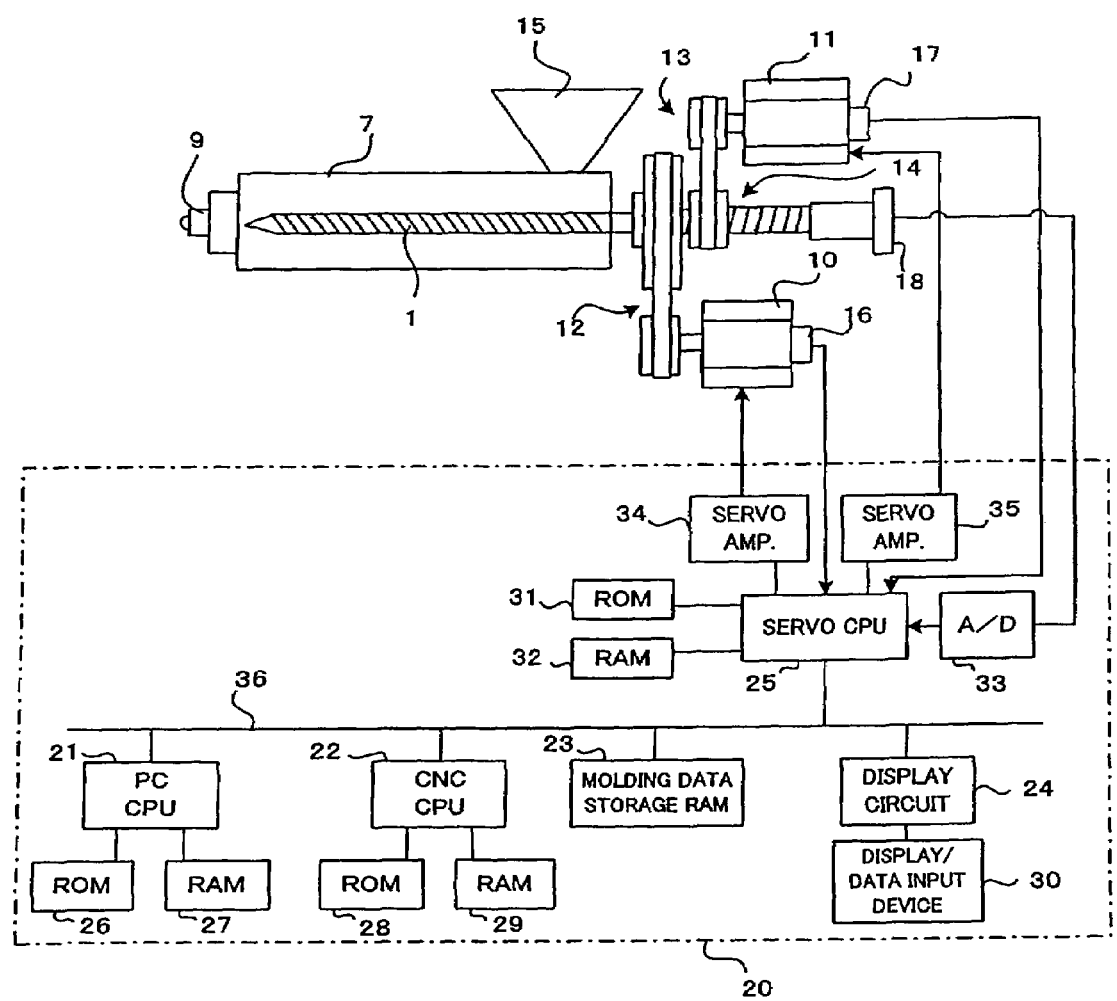
FIG. 5 is a block diagram showing essential parts of one embodiment of an injection molding machine adapting the check valve open/close state indication method of the present invention.

FIG. 5 is a block diagram showing essential parts of one embodiment of an injection molding machine adapting the check valve open/close state indication method of the present invention.

A nozzle 9 is attached to a front end of the cylinder 7 into which the screw 1 is inserted, and a feed hopper 15 that supplies resin pellets to an interior of the cylinder 7 is mounted on a rear end of the cylinder 7. A check valve comprising a check ring 3 and a check seat 4 is provided at a tip of the screw 1. The screw 1 is rotationally driven by a screw rotation servo motor 10 as a rotary driving means that rotationally drives the screw 1 via a transmission unit 12. Further, an injection servo motor 11 as an axial direction driving means that drives the screw 1 in the axial direction, drives the screw 1 in the axial direction and carries out injection and back pressure control via a transmission unit 13 and a ball screw/nut or other conversion unit 14 that converts rotary motion into linear motion. In addition, position/velocity sensors 16, 17 are mounted on the screw rotation servo motor 10 and the injection servo motor 11 to detect the rotational positions/velocities of these motors. The position/velocity detectors 16, 17 can detect a rotational velocity of the screw 1 and a position of the screw 1 (the screw axial direction position) as well as a movement velocity (injection velocity). Moreover, a pressure sensor 18 such as a load cell or the like that detects pressure exerted on the screw 1 from the melted resin is also provided.

A controller 20 that controls the injection molding machine comprises a CNC CPU 22 that is a microprocessor for numerical control, a PC CPU 21 that is a microprocessor for programmable controller, and a servo CPU 25 that is a microprocessor for servo control, all connected by a bus 36.

To the PC CPU 21 are connected a ROM 26 storing sequence programs and the like that control the sequence operations of the injection molding machine and a RAM 27 used for temporary storage of computational data and the like. To the CNC CPU 22 are connected a ROM 28 storing programs and the like for overall control of the injection molding machine and a RAM 29 used for temporary storage of computational data and like.

A ROM 31, storing control programs solely for servo control that carry out position loop, velocity loop, and electrical current loop processing, and a RAM 32, used for a temporary storage of data, are connected to the servo CPU 25. Further, a servo amp 34 for the screw rotation servo motor 10 and a servo amp 35 for the injection servo motor 11 are connected to the servo CPU 25, and position/velocity detectors 16, 17 are mounted on the servo motors 10, 11 respectively, with the outputs of the position/velocity detectors 16, 17 fed back to the servo CPU 25. The servo CPU 25 issues movement commands to the axes (the screw rotation server motor 10 and the injection server motor 11) commanded from the CNC CPU 22 and carries out position and velocity feedback control based on the positions and velocities that are fed back from the position/velocity detectors 16, 17, as well as carries out electrical current feedback control, and drives and controls the server motors 10, 11 through the servo amps 34, 35. In addition, present value registers are provided that store the rotational positions of the screw rotation servo motor 10 and the injection servo motor 11 that are fed back from the position/velocity detectors 16 and 17, respectively, so that the rotational position and the axial position (injection position) of the screw 1 can be detected from the rotational positions of the servo motors 10 and 11.

A resin pressure (resin pressure exerted on the screw 1) converted into a digital signal by an A/D converter 33 that converts the detection signal at the pressure sensor 18 into a digital signal is input to the CPU 25.

It should be noted that servo motors, servo amps, and the like for driving a clamping unit, an ejector unit, and so forth are also provided. However, as these are not directly related to the invention of the present application, they are omitted from FIG. 5.

A data input device 30 with a display device consisting of a liquid crystal or CRT display is connected to the bus 36 via a display circuit 24. Further, a molding data storage RAM 23 consisting of a nonvolatile memory is also connected to the bus 36. A variety of molding conditions and settings, parameters, macro variables, and the like relating to the injection molding operation are stored in the molding data storage RAM 23.

Using the configuration described above, the PC CPU 21 controls the sequence operations of the injection molding machine as a whole, the CNC CPU 22 distributes movement commands to the individual axes servo motors based on the operating programs stored in the ROM 28 and on the molding conditions stored in the molding data storage RAM 23, and the servo CPU 25, based on the movement commands distributed to the axes (the drive axes servo motors; that is, the screw rotation servo motor 10 and the injection servo motor 11) and on the feedback signals of the positions and velocities detected by the position/velocity detectors 16, 17, carries out the same servo control, such as position loop control, velocity loop control, and further, electrical current loop control, as is carried out conventionally, that is, executes so-called digital servo processing.

The above-described hardware configuration is not different from the conventional electric injection molding machine controller, the difference between the conventional controller and the present invention being that the present invention adds a rotational force measurement display function that measures, stores, and displays the rotational force exerted on the screw 1 during the injection and pressure holding stage.

In the present embodiment, a disturbance observer is provided as the rotational force detection means to detect the rotational force exerted on the screw 1, and a screw rotation direction load (rotational force) is obtained by the disturbance observer incorporated in screw rotation servo motor 10 drive control processing executed by the servo CPU 25. It should be noted that, in place of the observer, alternatively a strain gauge may be provided on the screw 1 to detect the rotational force exerted on the screw 1.

Figure 6:
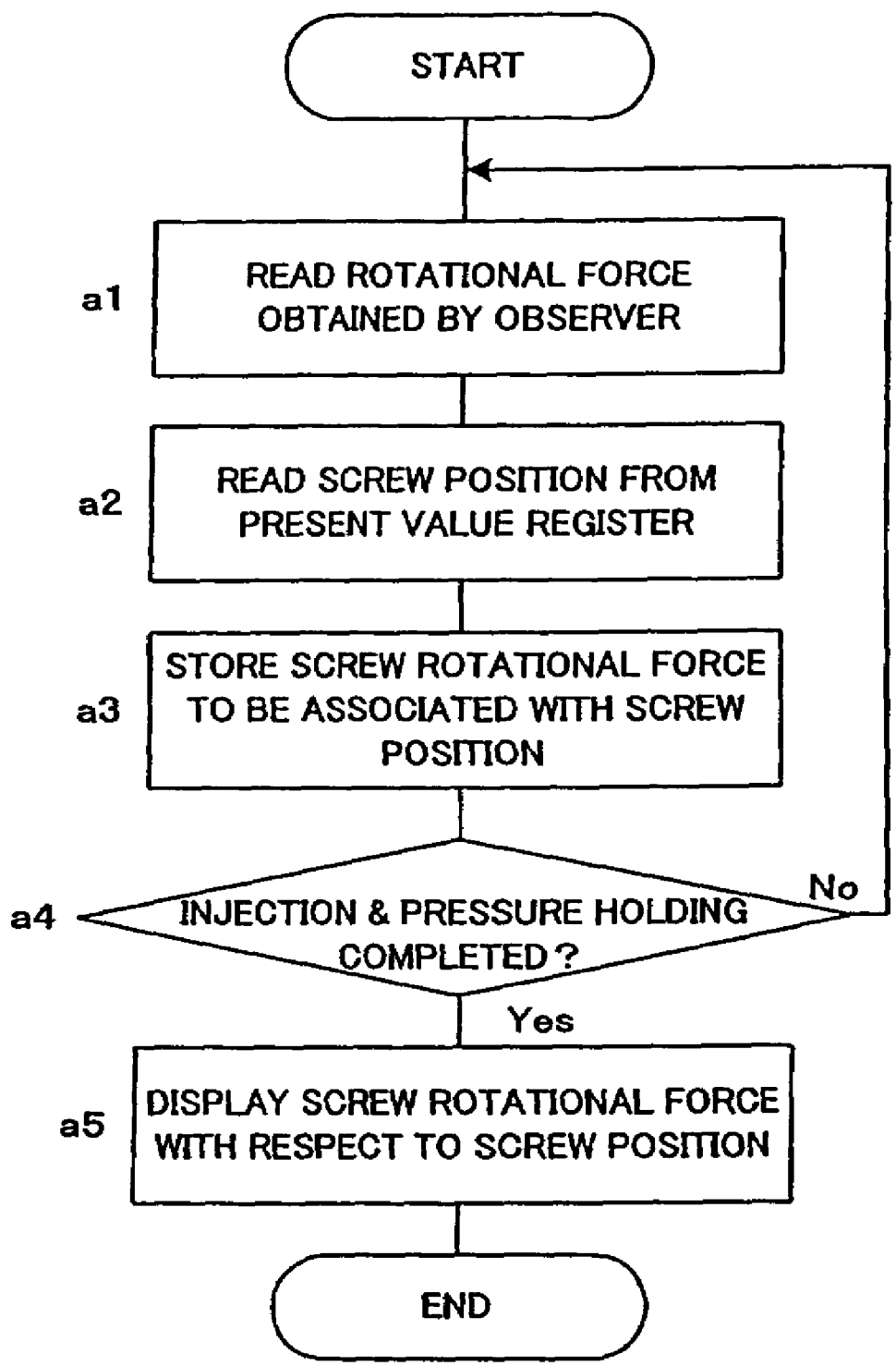
FIG. 6 is a flow chart illustrating an algorithm of a process of measuring and displaying the rotational force exerted on the screw performed by a controller of the injection molding machine during the injection and pressure holding stage in the embodiment shown in FIG. 5.

FIG. 6 is a flow chart illustrating an algorithm of the process of measuring and displaying the rotational force exerted on the screw performed by the injection molding machine controller during the injection and pressure holding stage.

Once injection is begun, the controller 20 CNC CPU 22 starts the rotational force measurement and display processing shown in FIG. 6.

First, a load obtained by the disturbance estimating observer which is incorporated in the drive control processing for the screw rotation servo motor 10 performed by the servo CPU 25, i.e. a rotational force exerted on the screw 1 is read (Step a1), and the screw position (the position of the screw in the axial direction) fed back from the position/velocity sensor 17 and stored in the present value register is read (Step a2).

The read screw rotational force is stored to be associated with the screw position in the RAM 29 (Step a3).

Then, it is determined whether or not the injection and pressure holding has been completed (Step a4). If injection and pressure holding has not been completed, then procedure returns to Step a1 and the routine of from Step a1 to Step a4 described above is repeatedly executed in a predetermined sampling cycle.

When the injection and pressure holding is completed, the screw rotational force stored to be associated with the screw position is displayed on the display screen of the display/data input device 30, and a waveform of the screw rotational force is displayed with the screw position represented on the horizontal axis and the screw rotational force representative on the vertical axis as shown in FIGS. 2, 3a-3c and 4a-4c (Step a5), to complete the procedure.

An operator can recognize an open/close state of the check valve from the displayed screw rotational force waveform pattern. In other words, as shown in FIGS. 3a-3c and FIGS. 4a-4c, the pattern of the waveform of the screw rotational force changes when the check valve closes, and from this fact, the closing of the check valve is indicated from the waveform pattern that is displayed. In addition, in the case of the usual pattern like that shown in FIG. 3a, in which the rotational force peak occurs in the first half of the start of injection, depending on when that peak occurs it is possible to determine the screw position at which the check valve closes. This screw position can then be used to judge the quality of the molded article and as a benchmark for adjusting the molding conditions.

It should be noted that the screw rotational force waveform pattern may be render superimposing a plurality of molding cycles one atop another, in which case the waveform of the newest molding cycle may be displayed in a different color, for example, or its display attributes otherwise changed and displayed so that it is clear that it is the newest wave form.

In addition, in the embodiments described above the screw rotational force waveform is associated with the screw position and displayed. Alternatively, however, the screw rotational force wave form may be displayed as a function of time. In that case, Step a2 of the processing shown in FIG. 6 become superfluous, in Step a3 the screw rotational force is stored chronologically, and further, in Step a5, the screw rotational force waveform is displayed with the horizontal axis representing time. Moreover, although rotational force measurement and display in the above-described embodiment is implemented until the pressure holding is completed, alternatively, detection and display of rotational force may be performed only during the injection stage, from injection control to the point at which a switch is made to pressure holding control.

Further, although the foregoing embodiments are described using the example of measuring and storing the screw rotational force during injection and pressure holding, in a case in which the screw is advanced prior to the start of injection and the check valve is closed, the screw rotational force may be measured and its waveform displayed during this stage of advancing the screw prior to injection.

Further, although the foregoing embodiments are described using the example of an injection molding machine that rotates the screw using an electric motor, the present invention is also applicable to an arrangement in which the screw is rotated using a hydraulic motor.

What is claimed is:

1. A method of indicating an open/close state of a check valve provided on a screw of an injection molding machine in which the screw is arranged rotatable for metering of resin and axially movable for injection of resin in a cylinder, the method comprising the steps of:

detecting a rotational force exerted by the resin on said screw while said screw is being axially driven during injection; and displaying variations of the detected rotational force as a waveform on a display device to indicate the open/close state of the check valve during injection based on the displayed waveform.

2. A method according to claim 1, wherein said detecting step comprises detecting the rotational force exerted by the resin on said screw and an associated axial position of said screw at every predetermined sampling period, and said displaying step comprises displaying the waveform of the detected rotational force with respect to the axial position of said screw.

3. A method according to claim 1, wherein said detecting step comprises detecting the rotational force exerted by the resin on said screw at every predetermined sampling period, and said displaying step comprises displaying the waveform of the detected rotational force with respect to time.

4. A method according to claim 1, further comprising:
    based on the displayed waveform, determining the close state of the check valve as the moment when the rotational force reaches a peak during a sampling period.

5. A method according to claim 1, further comprising:
    based on the displayed waveform, determining that the check valve is already closed at the start of a sampling period when the rotational force increases from an initial value to a higher value and remains substantially unchanged at said higher value for the rest of the sampling period.

6. A method according to claim 1, further comprising:
    based on the displayed waveform, determining that the check valve is not closed when the rotational force increases without peaking during a sampling period.

7. A method according to claim 1, further comprising:
    based on the displayed waveform having multiple peaks in a sampling period, determining that the check valve is incompletely closed at an earlier one among said peaks and is completely closed at a later one among said peaks.

8. A method according to claim 1, further comprising:
    based on the displayed waveform having a peak near the end of a sampling period, determining that the check valve is closed late at said peak.

9. A method according to claim 1, further comprising:
    based on the displayed waveform having a peak in a sampling period, determining that the check valve is incompletely closed at said peak when the rotational force increases without peaking again during the rest of the sampling period.

10. A method according to claim 1, wherein said rotational force is caused by a backflow of the resin from a front to a rear of the check valve before the check valve is closed, and reaches a peak on the displayed waveform at the moment when the check valve is closed;

said method further comprising, based on the peak of the rotation force and an associated screw position at said peak, at least one of evaluating an amount of resin backflow;

judging a quality of molded articles; and adjusting molding conditions.

\* \* \* \* \*